Sept. 1, 1925.  
E. H. MOSHER  
1,552,333  
SCAFFOLDING  
Filed Oct. 13, 1923  
5 Sheets-Sheet 1

Edgar H. Mosher  
INVENTOR  
BY Victor J. Evans  
ATTORNEY

WITNESS:

Sept. 1, 1925.

E. H. MOSHER

SCAFFOLDING

Filed Oct. 13, 1923

Edgar H. Mosher
INVENTOR

BY Victor J. Evans
ATTORNEY

WITNESS:

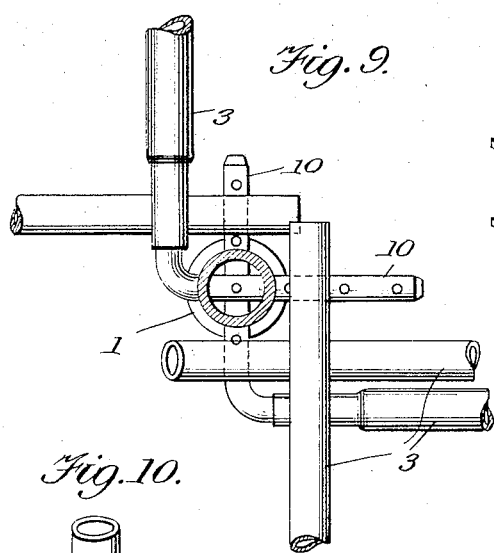
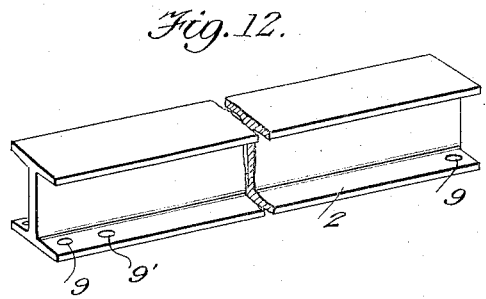
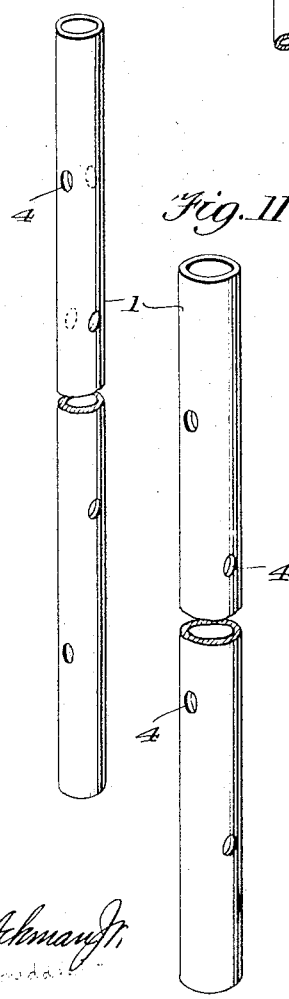
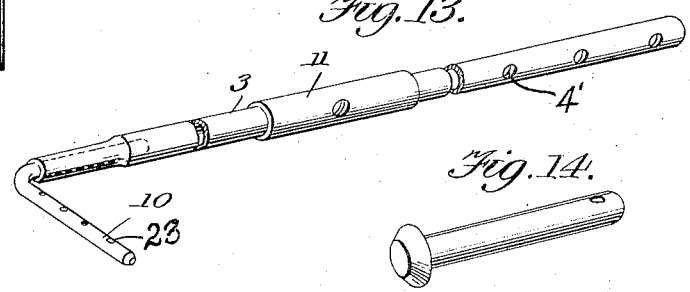
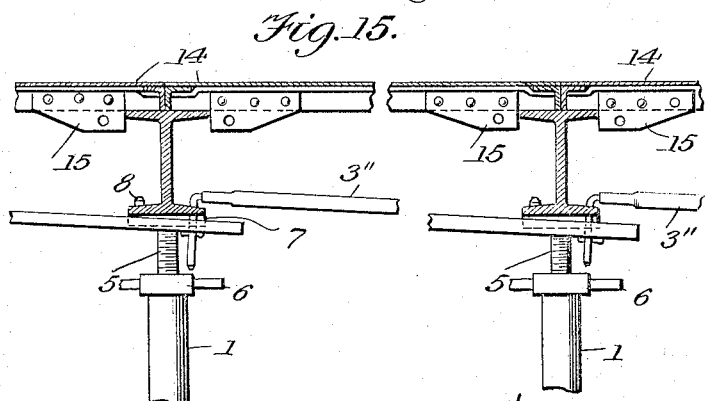
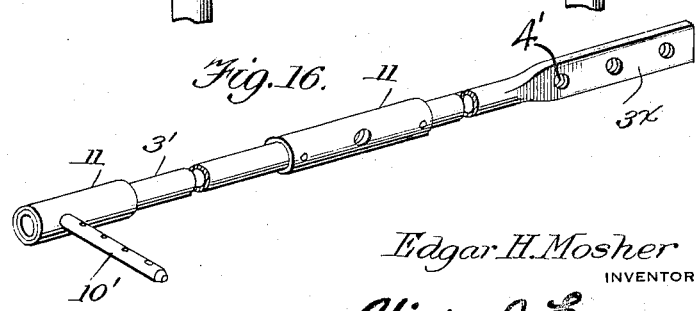

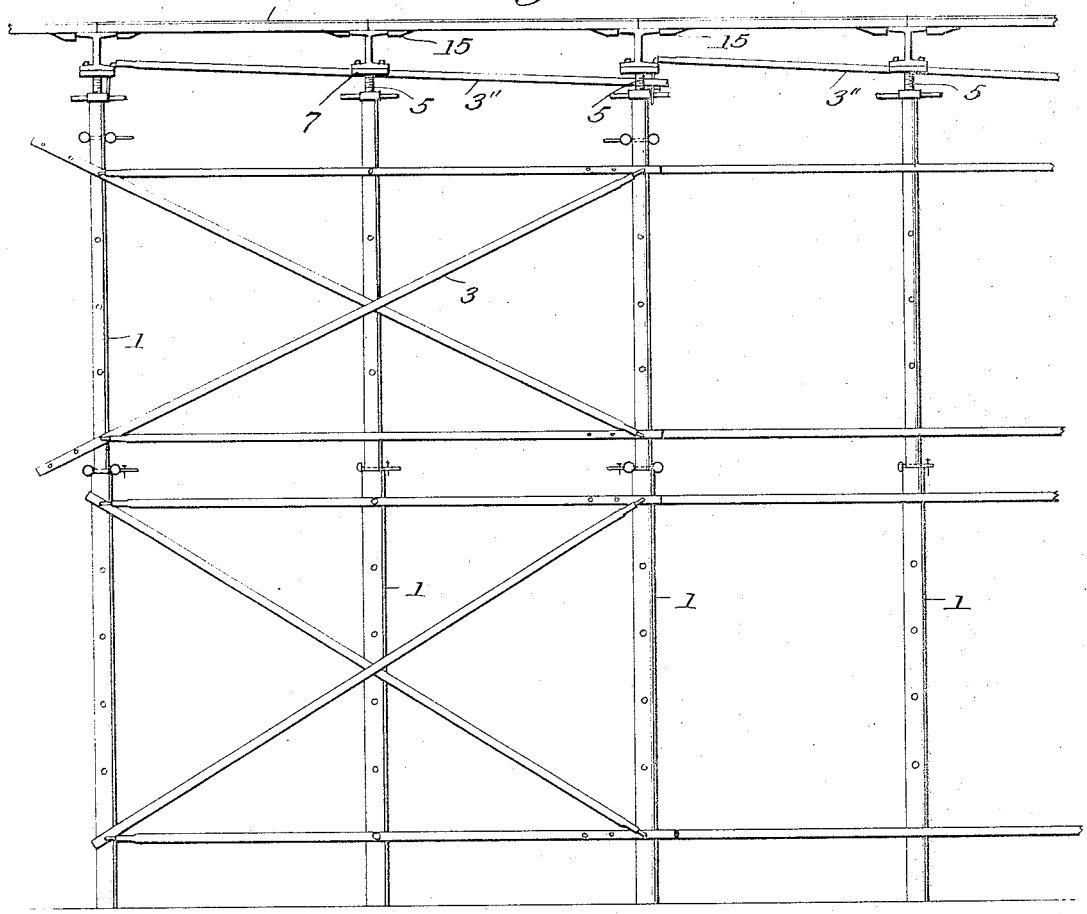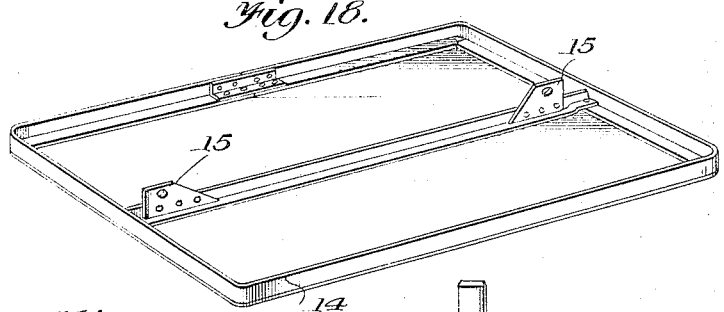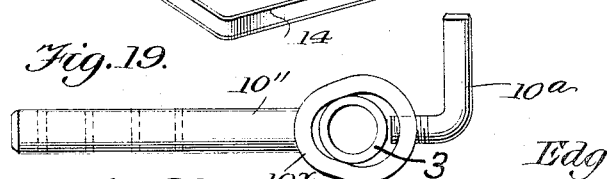

Sept. 1, 1925.
E. H. MOSHER
SCAFFOLDING
Filed Oct. 13, 1923
1,552,333
5 Sheets-Sheet 5
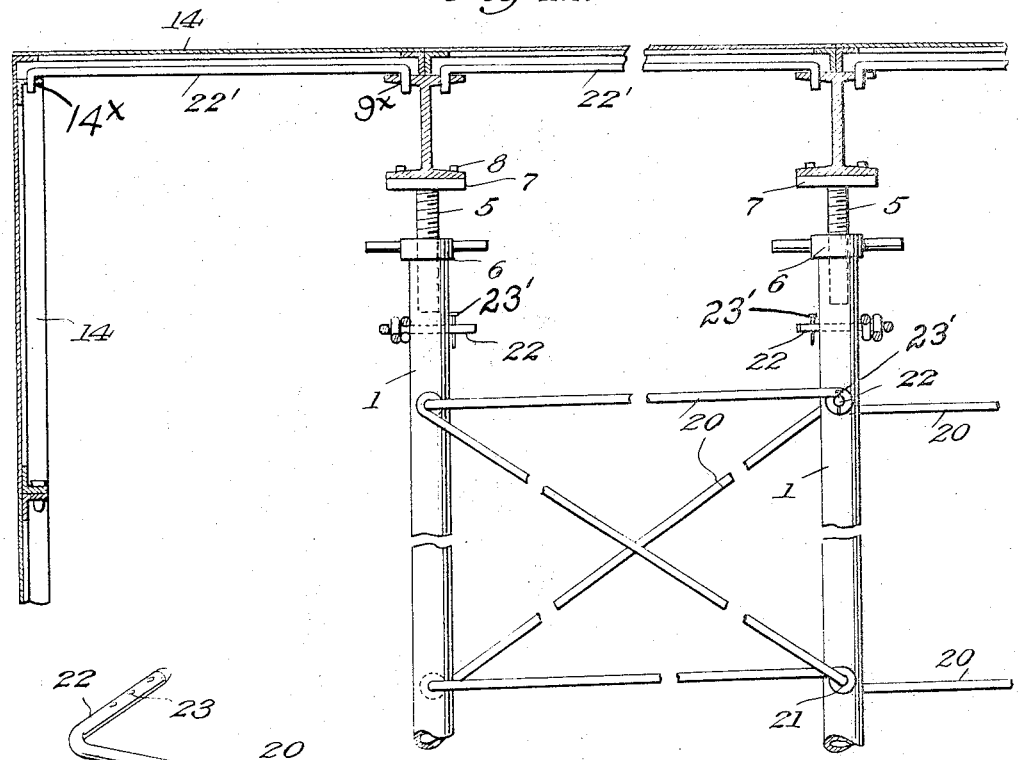
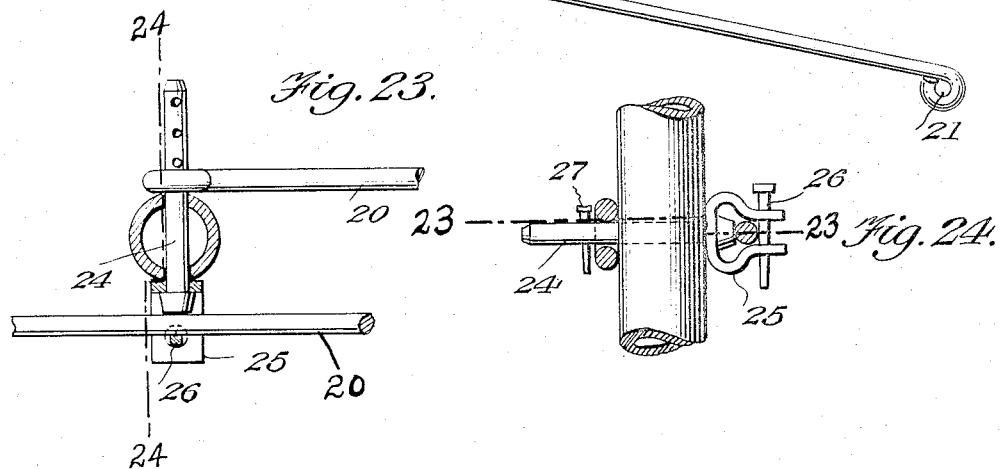
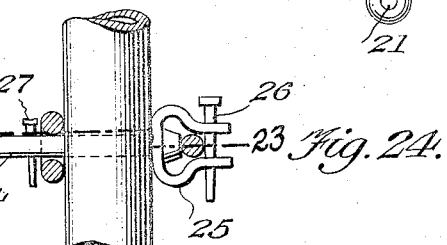
Edgar H. Mosher
INVENTOR
BY Victor J. Evans
ATTORNEY
WITNESS:

Patented Sept. 1, 1925.

1,552,333

UNITED STATES PATENT OFFICE.

EDGAR H. MOSHER, OF WASHINGTON, DISTRICT OF COLUMBIA.

SCAFFOLDING.

Application filed October 13, 1923. Serial No. 668,440.

*To all whom it may concern:*

Be it known that I, EDGAR H. MOSHER, a citizen of the United States, residing at Washington, in the District of Columbia, have invented new and useful Improvements in Scaffolding, of which the following is a specification.

This invention relates to a scaffolding which is mainly designed for supporting flooring and ceilings in structures formed of concrete and the like, the general object of the invention being to provide means which can be adjusted to properly support the flooring and which can be easily and quickly assembled and disassembled so that the parts can be used over and over again.

Another object of the invention is to place the adjusting means at the top of the uprights so that they can be easily manipulated and without interfering with the other parts of the scaffolding.

A further object of the invention is to form the connecting means so that the scaffold can be erected without the use of tools.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 9 is a section on approximately the line 9—9 of Figure 1.

Figure 10 is a view of the upper section of a post.

Figure 11 is a view of the lower section.

Figure 12 is a view of one of the I beams

Figure 13 is a view of one of the braces.

Figure 14 is a view of one of the pins used with the braces.

Figure 15 is a fragmentary sectional view showing the arrangement of parts at the top of the scaffolding.

Figure 16 is a modified form of brace.

Figure 17 is an elevation showing a slightly different arrangement of parts from that shown in Figure 1.

Figure 18 is a view of one of the floor molds.

Figures 19 and 20 are views showing means for making the hole engaging portions of the brace adjustable.

Figure 21 is a view, partly in section, showing another arrangement of parts.

Figure 22 is a perspective view of one of the braces used in this arrangement.

Figure 23 is a section on line 23—23 of Figure 24.

Figure 24 is a section on line 24—24 of Figure 23.

Figure 1:
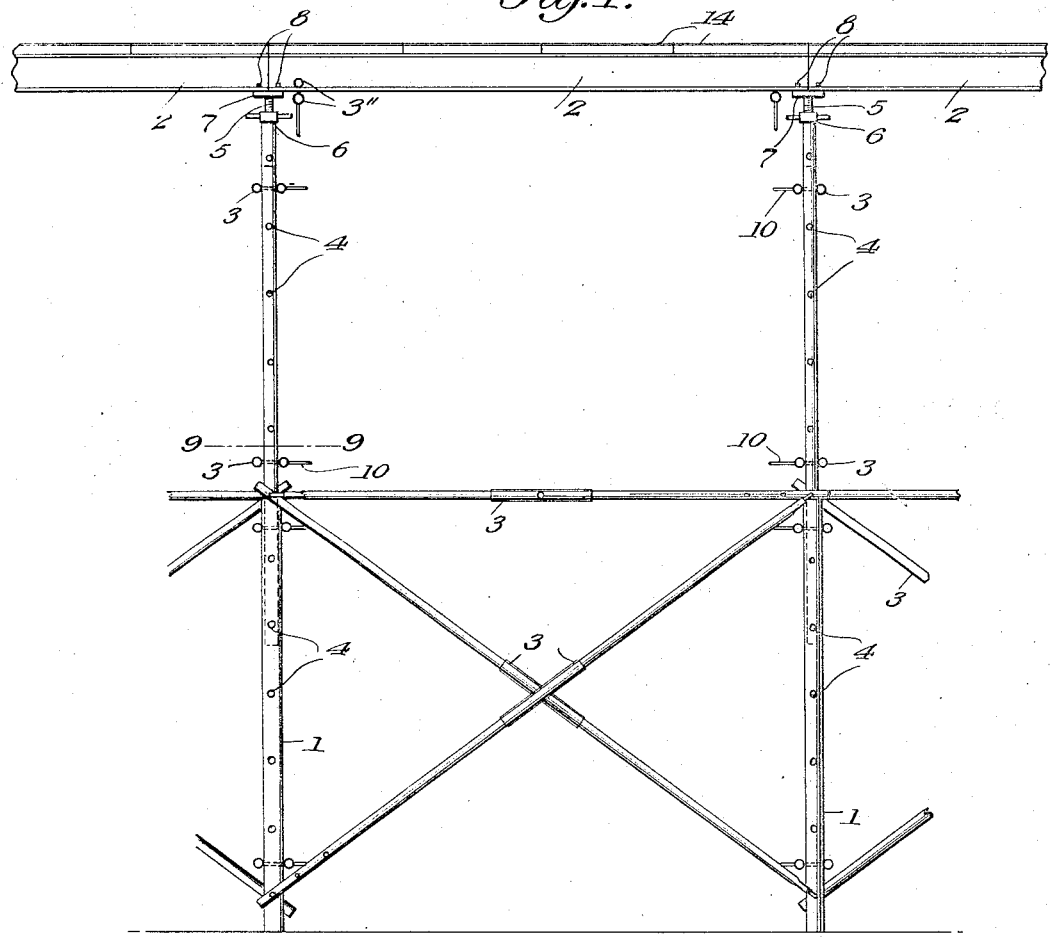
Figure 1 is an elevation showing the invention in use.
Figure 2:
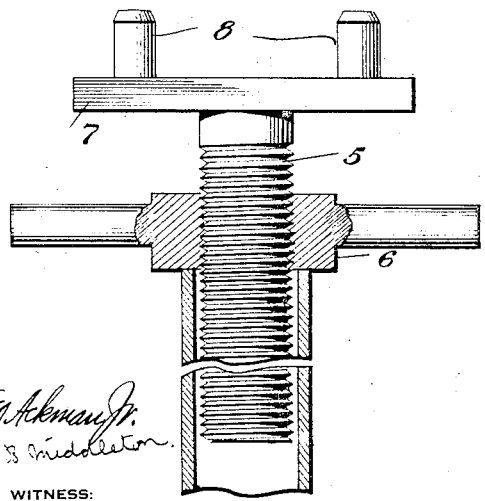
Figure 2 is a detail sectional view of one of the jacks.
Figure 3:
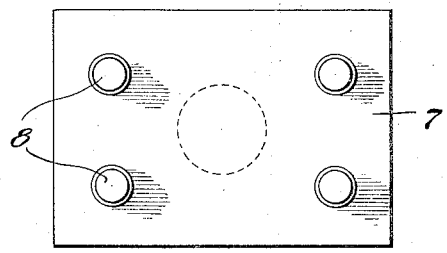
Figure 3 is a plan view of one of the jacks.

As shown in these views the scaffolding consists of the uprights 1, the I-beams 2 and the braces 3. Each upright is formed of a number of telescopic sections, each of which is provided with a plurality of holes 4 for receiving pins or the like which hold the sections in adjusted position. A screw jack 5 engages a nut 6 at the top of each upright and each jack includes a plate 7 which is provided with four projections 8 which engage holes 9 in the I-beams. The I-beams may have their abutting ends at the centers of the uprights with a pair of the projections engaging a pair of holes in one I-beam and the other pair of projections engaging a pair of holes in the other I-beam. The projections act to prevent movement of the beams and also act to properly position the I beams in relation to each other.

As shown in Figures 10 and 11 I prefer to arrange the holes 4 in the sections of the uprights with alternate holes at right angles so that a greater number of holes may be placed in the sections without weakening the sections. This provides a greater range of adjustability so that the necessary adjustment of each upright can be approximately made by adjusting the sections in relation to each other and then making the final adjustment by the jack. By making the final adjustment by the jacks it is not necessary to lift the entire weight of the uprights and braces as only the I-beams and forms are raised or lowered with the jacks. This adjustment by the jacks will not interfere with the other parts of the scaffolding as the parts below the jacks will not be moved.

The braces are provided with right angularly extending ends 10 of reduced diameter and so formed that they can enter the holes 4 in the uprights and thus act to hold the sections of the uprights in adjusted position. In this way it is unnecessary to use the pins for different purposes. Each part 10 is provided with a plurality of holes to receive pins or nails to prevent it from being withdrawn from the hole. This part 10 may be connected with the other part of the brace, as shown in Figure 13, where it is made in the form of a rod which engages a reduced part of the tubular brace or it may be formed as shown in Figure 16 where it is shown as being in the form of a pin 10' which passes through holes made in the end of the tubular part 3' of the brace. In both forms the brace is reinforced by the sleeves 11, where the holes 4' occur, the holes also passing through the sleeves and in Figure 16 a sleeve is located at the end of the brace and the part 10' passes through this sleeve. In Figure 13 the brace is of tubular form throughout but in Figure 16 one end is flattened, as at 3ˣ, so as to facilitate the securing of this end of the brace to the uprights. As shown in detail in Figure 9 the bent ends of the braces can be used for securing the straight ends of other braces to the uprights.

The braces can be used as X-braces and horizontal braces and they can also be used for connecting together the I-beams. Figure 15 shows the braces 3'' having their bent ends engaging holes 9' in the I-beams and also engaging the holes in the straight ends of the other braces so that the I-beams are securely tied together by these braces.

Figure 4:
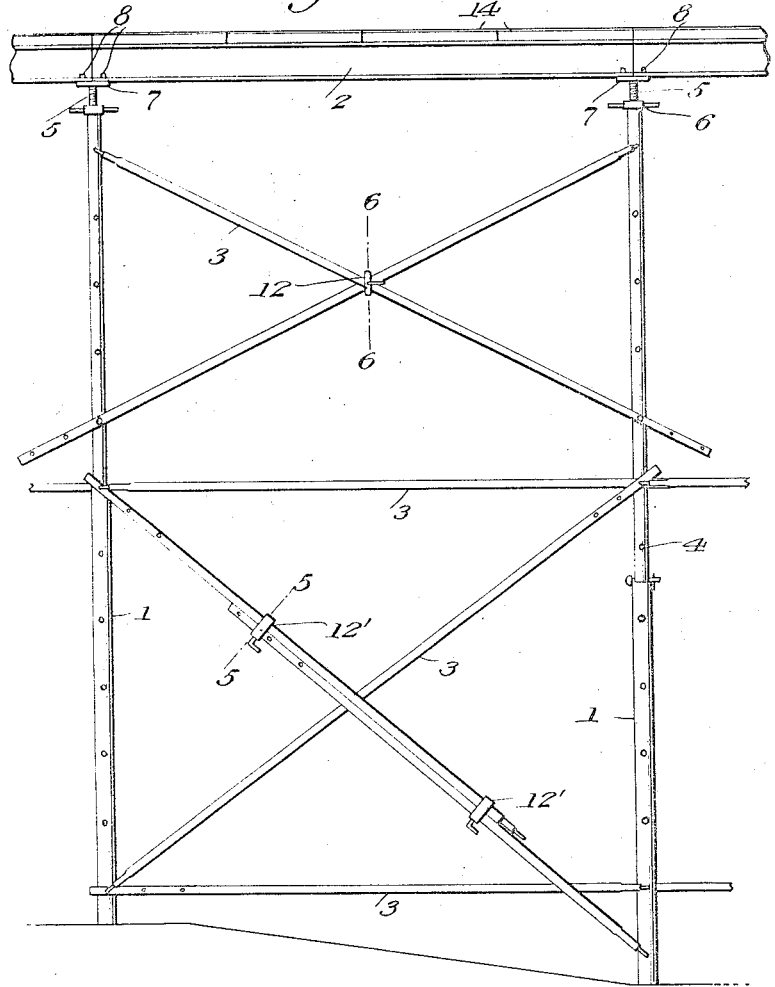
Figure 4 is an elevation showing how the invention is used where the ground or floor upon which the scaffolding is erected is uneven.
Figure 5:
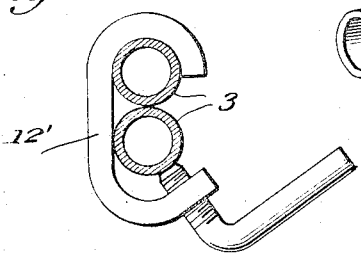
Figure 5 is a section on line 5—5 of Figure 4.
Figure 7:
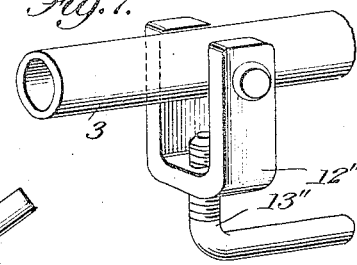
Figure 7 is a modified form of clamp.
Figure 6:
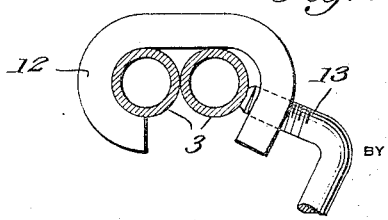
Figure 6 is a section on line 6—6 of Figure 4.

The X braces may be connected together at their centers by the clamp 12 which is of C-shape so as to embrace both braces and the parts are clamped together by the clamping screw 13 which engages the screw threaded hole in the clamp. This arrangement of parts is shown in detail in Figure 6.

Where it is necessary to have one upright longer than the other, due to an uneven base, as shown in Figure 4, it may be necessary to make one of the cross braces longer than the other. I may do this by clamping together two braces by using a pair of C clamps 12', the clamps being tightened to lock the two braces together, after they have been adjusted to secure the proper length. One of these clamps is shown in Figure 5, Figure 7 shows a modified form of clamp 12'' which is riveted to one of the braces and is adapted to be clamped to the other brace by the screw 13'.

I make the forms 14, shown in Figure 18, with lugs 15 for engaging the I-beams, as shown in Figures 15 and 17, so that these lugs will hold the forms against movement when placed upon the I-beams.

Figure 8:
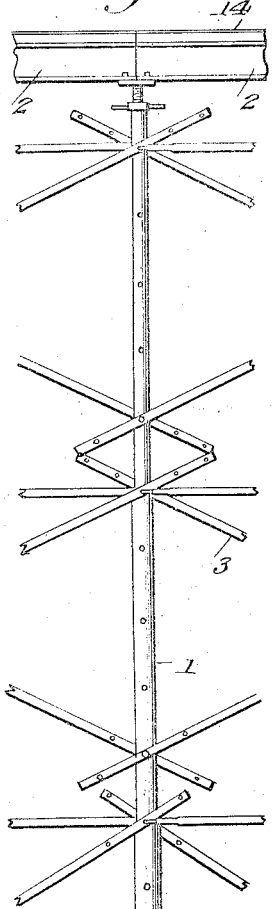
Figure 8 is a view showing a post or upright formed of three sections.

Figure 8 shows an upright formed in three sections. It will of course be understood that the number of sections used will depend upon the height of the ceiling.

From the above it will be seen that the scaffolding can be erected very easily and quickly and without the use of tools. The construction of the uprights and braces enables the scaffolding to be erected to suit buildings of various kinds and dimensions and the scaffolding can be made to support great weight by using a sufficient number of the braces to insure the proper strength of the structure.

It will of course be understood that pins, such as shown in Figure 14, can be used wherever desired or necessary and that these pins can take the place of the bent ends of the braces for holding the sections of the uprights in adjusted position.

Instead of using the right angular extending parts on the braces, as shown in Figures 13 and 16, I may use adjustable parts 10'', as shown in Figures 19 and 20, which are provided with the collars 10ˣ for receiving the tubular parts of the braces and which are secured to the braces by the clamping bolts 10ᵃ.

These adjustable members 10'' may be used in connection with the braces having the right-angular extending parts as they can be used at the straight ends of such braces so that one projection will be adjustable and the other stationary. For instance, the two-part brace shown in Figure 4 can be replaced by a long brace having a stationary right-angular extending part at one end and the adjustable part at its other end so that the brace can be made to fit between the uprights.

In the arrangement shown in Figures 21 to 24, the braces 20 are each provided with an eye 21 at one end and its other end is bent, as at 22, to pass through holes formed in the uprights. The bent end is provided with holes 23 to receive pins or other fastening means. As shown in Figure 21, these braces have their bent ends 22 passing through holes in the upright and they also pass through the eyes of other braces and then pins 23' are placed in the holes 23 to hold the parts in assembled position. Where the braces are too long I provide clamping means which consists of pins 24 which are adapted to be passed through holes in the uprights and which have their heads engaging clips 25 through which a portion of the brace passes, the brace being frictionally held in position by driving a nail 26 through holes in the clip, so as to wedge the brace between the nail and the head of the pin, as shown in Figures 23 and 24 and also in Figure 21. The pin 24 can also engage an eye of a brace, as shown in Figures 23 and 24, the parts being held in position by a nail 27. The forms 14 may also be held to the I-beams 2 by means of the braces 22' which are each formed with a bent end for engaging the holes 9˟ in the upper flanges of the I-beams, the end brace having its outer end engaging a hole 14˟ in the flange of the form 14 which is vertically arranged to form the side wall of the building. The bent ends of the braces will act to prevent sliding movement of the forms by engaging the flanges so that the lugs 15, shown in Figure 18, are not necessary when these braces 22' are used.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A supporting structure of the class described comprising uprights, means enabling the uprights to be adjusted as to their length, braces, and means for adjustably connecting the braces to the uprights, parts of such means forming parts of the adjusting means for the uprights.

2. A supporting structure of the class described comprising telescopic uprights, braces for the uprights, and projections on the braces engaging the uprights for holding the braces to the uprights and for holding the telescopic parts of the uprights in adjusted position.

3. A supporting structure of the class described comprising uprights adjustable as to their length, a screw jack at the upper end of each upright, projections forming part of each jack and beams having holes adjacent their ends the projections on each jack engaging holes in the abutting ends of a pair of beams for holding the beams together.

4. A supporting structure of the class described comprising telescopic uprights, pin receiving holes in portions of the uprights for permitting the parts of the uprights to be held in adjusted position, braces having projections thereon for engaging some of the holes, said braces having holes therein for receiving the projections of other braces to hold the parts assembled.

5. A supporting structure of the class described comprising telescopic uprights, beams supported by the uprights, said beams having holes therein, braces for connecting the beams together, each brace having a projection at one end thereof and holes in its other end, the projection of each brace passing through a hole in a beam and a hole in another brace for connecting the beams and braces together.

6. A supporting structure of the class described comprising telescopic uprights, braces detachably and adjustably connected with the uprights, longitudinally adjustable members at the upper ends of the uprights and projections on said members arranged in pairs and beams having holes therein arranged in pairs one pair of projections engaging holes at one end of a beam and the other pair engaging holes in the abutting end of another beam.

7. A supporting structure of the class described comprising uprights having holes therein, braces for the uprights, each having an eye at one end and its other end bent, pins for engaging some of the holes in the uprights, each pin having a head and holes in its stem, a clip engaging each head and having holes in its limbs and a wedge member for engaging the holes in the clip for wedging a brace between itself and the head of the pin.

In testimony whereof I affix my signature.

EDGAR H. MOSHER.